United States Patent [19]
Cervos et al.

[11] Patent Number: 5,492,701
[45] Date of Patent: Feb. 20, 1996

[54] PROCESS FOR THE PREPARATION OF SPHERULES

[75] Inventors: Eric Cervos, Champagne Au Mont D'or; Pierre Labourt-Ibarre, Lyons; Jean-Claude Le Thiesse, Saint-Etienne; Eraclis Statiotis, Villette D'Anthon, all of France

[73] Assignee: Rhone-Poulenc Nutrition Animale, Antony, France

[21] Appl. No.: 272,337

[22] Filed: Jul. 8, 1994

[30] Foreign Application Priority Data

Jul. 8, 1993 [FR] France .................................. 93 08386

[51] Int. Cl.⁶ ..................................................... A61K 9/14
[52] U.S. Cl. ......................... 424/489; 424/490; 424/491; 424/451
[58] Field of Search ....................... 424/489, 490, 424/491, 401, 451

[56] References Cited

U.S. PATENT DOCUMENTS

| | | | |
|---|---|---|---|
| 4,670,247 | 6/1987 | Scialpi | 424/484 |
| 4,921,705 | 5/1990 | Arai et al. | 424/450 |
| 5,023,235 | 6/1991 | N'Guyen et al. | 514/18 |
| 5,137,725 | 8/1992 | Handjani et al. | 424/401 |
| 5,186,948 | 2/1993 | Takei | 425/5 |
| 5,188,838 | 2/1993 | Deleuil et al. | 424/451 |

FOREIGN PATENT DOCUMENTS

| | | |
|---|---|---|
| 16217/83 | 1/1984 | Australia . |
| 0097907 | 1/1984 | European Pat. Off. . |
| 0285682 | 6/1987 | European Pat. Off. . |
| 0261616 | 3/1988 | European Pat. Off. . |
| 0515997 | 12/1992 | European Pat. Off. . |

*Primary Examiner*—Thurman K. Page
*Assistant Examiner*—William E. Benston, Jr.
*Attorney, Agent, or Firm*—Finnegan, Henderson, Farabow, Garrett & Dunner

[57] ABSTRACT

An oil-in-water emulsion is passed through a nozzle to form spherules which are allowed to fall countercurrent to a flow of cold air and which are recovered utilizing either a liquid crosslinking agent or a solution, preferably aqueous, optionally containing a crosslinking agent.

22 Claims, 2 Drawing Sheets

PROCESS FOR THE PREPARATION OF SPHERULES

The present invention relates to a new process for stabilizing one or more alimentary and/or medicinal active principles. It also relates to a process for the preparation and, optionally, the isolation of spherules of active principles and also relates to the spherules obtained.

Representative alimentary and/or medicinal active principles which may be used for preparing the spherules according to the invention, include (1) vitamins, such as: vitamin A, vitamin E, vitamin $B_{12}$, vitamin H or biotin, vitamin $D_3$, vitamin PP, vitamin $K_3$ or menadione, vitamin $B_1$ or thiamine, vitamin $B_2$ or riboflavin, vitamin $B_3$ or niacin, vitamin $B_5$ or pantothenic acid, vitamin $B_6$ or pyridoxine, (2) carotenoids, such as: β-carotene, astaxanthin and canthaxanthin, and (3) enzymes, such as: β-glucanase and xylanase.

Of the vitamins, it is preferred to stabilize vitamins A and E.

Vitamins A and E are widely employed in animal feed to promote animal growth. Since feedstuffs for animals are frequently prepared by a process which consists in forming particles by the combined action of pressure and heat, the active principles which are sensitive to heat and to pressure cannot be subjected to this procedure without undergoing considerable degradation.

To preserve vitamin A, for example, it has long been known to protect it by mixing it with proteins crosslinked in the presence of an aldehyde.

Various processes for the crosslinking of proteins in the presence or absence of vitamin A have been described. Crosslinking of proteins in the presence of vitamin A or E presents an additional problem when compared with crosslinking in the absence of vitamin A or E. Vitamin A in the acetate form and vitamin E are oily products which only mix with proteins and their crosslinking agent in the form of an oil-in-water emulsion, which is never easy to handle. Crosslinking of the protein also requires heating for a relatively long period, which is not favorable to the stability of these vitamins.

A first process for crosslinking gelatin in the presence of acetaldehyde, to protect vitamin A, is, for example, shown in Patent EP 261,616. In this patent, an "intimate" mixture containing the protein, a water-miscible alcohol, acetaldehyde and approximately 5% of water and vitamin A is produced. In this so-called "intimate" mixture vitamin A is in the form of drops of less than 10 microns. This mixture is freeze-dried so as to obtain solid particles having a diameter between 100 and 800 microns. The solid particles can then be subjected to acetaldehyde vapor for a period of approximately 3 hours at a temperature between 50° C. and 90° C.

The method of preparation utilizing solid particles in EP 261,616 cannot be achieved as a continuous process because it is carried out in two steps, each of which can require a different type of apparatus: a freeze-drier (lyophilizer) and a spraying apparatus. Freeze-drying is the more costly of these two steps because of extremely limited production efficiency, which results in an expensive product.

A process for the preparation of beadlets of vitamin A is described in Patent EP 285,682. According to this process, an emulsion is prepared containing the vitamin, water, gelatin and a sugar, which is converted into drops by atomization, and these drops are individually brought into contact with a cellulose powder which must display very specific characteristics. This bringing of each of the drops into contact with the cellulose powder is achieved by various techniques until the drops harden.

The hardened drops are then separated from the cellulose powder by screening (sieving), wherein the screen retains the hardened drops and allows the powder to pass through. This can involve a strict choice of the cellulose powder particle size and also difficulty regarding agglomeration characteristics of the powder during the implementation of the process.

The hardened drops are next dried and then subjected to a heating operation to ensure crosslinking of the gelatin by reaction of the amino groups of the gelatin with the carboxyl functional groups of the sugar. This process is particularly difficult to implement because it requires a strict choice of the materials employed and particularly close surveillance of the conditions under which the process is implemented.

The present invention has made it possible to solve the problems left by the prior art and, above all, has made it possible to achieve a process which can be very easy to implement.

A process of the present invention for the preparation of spherules of one or more alimentary or medicinal active principles in oily form comprises:

in a first step, preparing an oil-in-water emulsion of:
  one or more active principles in oily form suspended in water, the water optionally containing at least one protein;

in a second step, forming spherules by passing the oil-in-water emulsion through a nozzle;

in a third step, allowing the spherules formed to fall in a tower countercurrent to a flow of cold air either into at least one liquid crosslinking agent for a time sufficient to crosslink the spherules or into a solution, preferably aqueous, optionally containing a crosslinking agent, and optionally for a time sufficient to crosslink the spherules; and in a fourth step, recovering the spherules from said liquid crosslinking agent or said solution, said spherules optionally being crosslinked.

Figure 1:
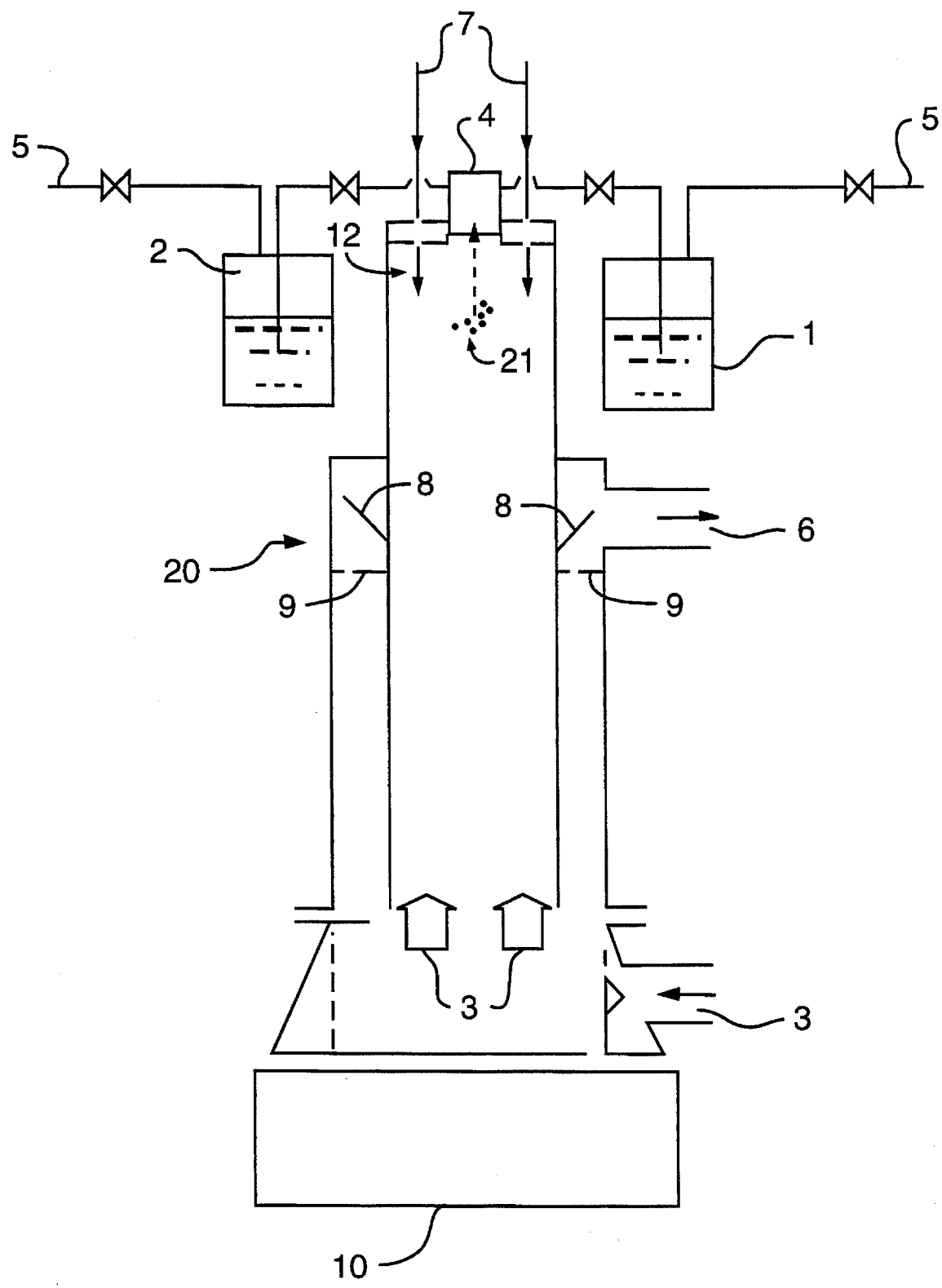
FIG. 1 is a diagram, not drawn to scale, illustrating a prilling tower useful in the formation of spherules and a recovery trough of liquid crosslinking agent or a solution, optionally containing a crosslinking agent.

As defined herein, an active principle is an alimentary or medicinal active principle, which can be a liquid or a solid, preferably chosen from (1) vitamins in the oily form such as, for example, vitamin A or vitamin E or (2) active principles which are converted to an oily form by, for example, being dissolved or dispersed in an edible oil. The edible oils are chosen, for example, from vegetable or animal oils such as peanut, sunflower, rapeseed or cod liver oil.

The term "oily" herein is used in its ordinary meaning, i.e. of, relating to or consisting of oil. The active principle, whether obtained in an oily form, or whether converted to an oily form by, for example, being dissolved or dispersed in an edible oil, is to be sufficiently oily to be able to form the oil-in-water emulsion discussed herein when combined with water, the water optionally containing at least one protein.

To the active principle in oily form may optionally be added one or more antioxidant agents such as ionol, 3-tert-butyl-4-hydroxyanisole (BHA), 3,5-di-tert-butyl-4-hydroxytoluene (BHT), 6-ethoxy-1,2-dihydroxy-2,2,4-trimethylquinoline (ethoxyquine), 2-tert-butyl-1,4-dihydroxybenzene (sold under the trademark EMBANOX) and vitamin E.

The active principle in oily form, which may, for example, be in the form of a solution or a mixture, may also contain one or more surface-active agents preferably selected from dilauryl thiodipropionate (sold under the trademark IRGANOX), an alkali metal or alkaline-earth metal stearate, sodium or calcium 2-stearoyllactylate and carboxymethyl cellulose.

According to a preferred method of implementation of the invention for the formation of spherules, and particularly of spherules of vitamin A, the active principle in oily form, the antioxidant agent, and the surfactant are combined in the following proportions:

| | |
|---|---|
| vitamin A acetate | 70 to 80% |
| antioxidant agent | 10 to 30% |
| surfactant | 0 to 5% |

Preferably, a protein is utilized for ultimate crosslinking and, more preferably, the protein is dissolved in water at a temperature higher than the gelling temperature. It is preferable to employ gelatin. The aqueous solution of protein may also optionally contain a surface-active agent such as those mentioned above.

The aqueous protein solution preferably contains approximately 10 to 60% (preferably 20 to 30%) by weight of protein, e.g. gelatin, and optionally contains approximately 10 to 60% (preferably 10–20%) by weight of a sugar (e.g. glucose, lactose, fructose, sucrose, maltodextrin) or of glycerol.

The oil-in-water emulsion is preferably formed by dispersion of the at least one active principle in oily form, optionally combined, as set forth above, with the antioxidant agent and/or the surfactant, in either water or in an aqueous solvent containing the protein and, optionally, surface-active agent, sugar or glycerol, as explained above, at a temperature greater than the gel point of the solvent. If a surfactant is used, it can assist in the formation of the oil-in-water emulsion.

The oil-in-water emulsion is preferably prepared by mixing approximately 10 to 30% by weight of the active principle in oily form, optionally containing additives, such as those specified above, and from 70 to 90% by weight of the aqueous protein solution, optionally containing additives, such as those specified above. Other mixtures, containing different quantities of each of the solutions can, of course, be prepared and are within the scope of the invention. The recommended quantities are merely preferable.

After the spherules have been formed by passing an oil-in-water emulsion through a nozzle (preferably, the spherules are formed at the exit of the nozzle), a protein crosslinking agent may be employed to crosslink the protein. The agent is chosen, for example, from acetaldehyde, glutaraldehyde and glyoxal. The crosslinking agent optionally employed may be used in the pure state as a liquid crosslinking agent or for example, in solution, preferably aqueous solution, at a concentration of between 5 and 20%.

Figure 2:
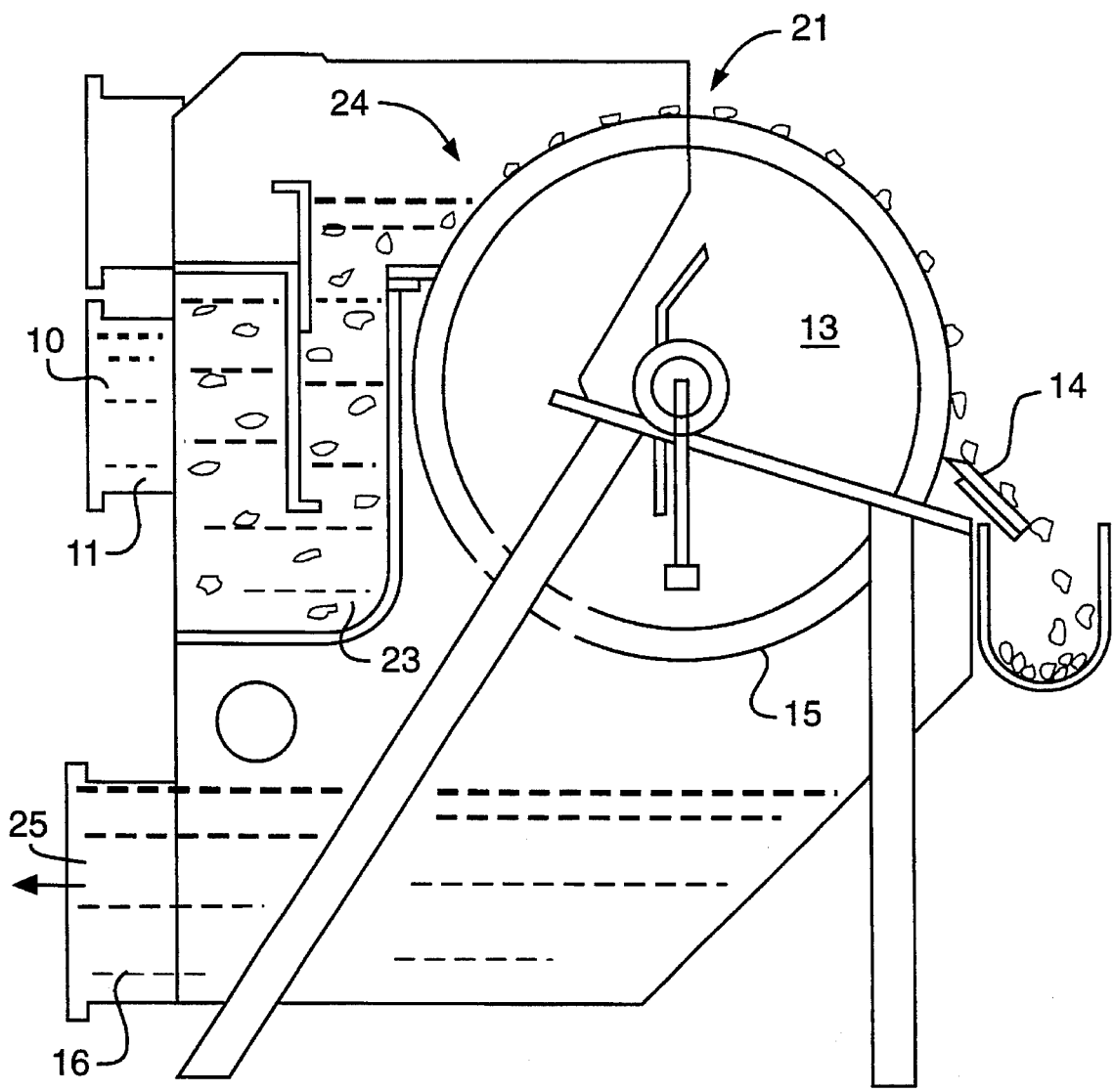
FIG. 2 is a diagram, not drawn to scale, illustrating a preferred relationship of the recovery trough shown in FIG. 1 and an isolation system shown in FIG. 2 useful in the isolation of spherules and which can also be useful in recycling the crosslinking agent or solution to the recovery trough.

The hardware preferably employed for implementation of the invention consists of two units. The first unit, which can be refered to as the prilling tower, and which is shown in FIG. 1, is used for the formation of the spherules and basically consists of a nozzle (4) and a cooling tower (20), of types which are commercially available. A cooling tower of a similar type is shown in U.S. Pat. No. 5,188,838, the disclosure of which is specifically incorporated by reference herein. The second unit, which can be referred to as the recovery and isolation system, and which is shown in detail in FIG. 2, is used for the recovery of the spherules formed and can be routinely made by one skilled in the art in view of the teachings of this patent specification.

The nozzle (4) employed in the first unit is preferably a nozzle that is subjected to a high-frequency (500 to 10,000 hertz) electrical vibration system. This nozzle may have one or more perforations whose diameter will determine the size of the desired spherules.

Within the scope of the present invention it is preferable to obtain spherules which have a mean diameter of 300 microns. A nozzle which has perforations with a diameter of approximately 100 microns is thus preferably employed.

One or more streams of air (7) can be injected into the nozzle concurrently with a jet of air (12) leaving the nozzle, so as to obtain better uniformity in the size of the spherules and to prevent coalescence of the drops. This stream of air (7) injected into the nozzle preferably has a temperature between ambient temperature and 60° C.

A separate stream of cold air can be introduced into the bottom of the tower (20) at entrance(s) (3) to ensure "freezing" of the spherules. This stream of cold air preferably has a temperature of between −20° C. and 20° C., and more preferably between −5° C. and 5° C. The cold air preferably leaves the tower (20) below the nozzle (4) through coolant exit (6) at a distance of approximately one tenth of the distance from the nozzle to the bottom of the tower. The tower has a height preferably between 4 and 8 meters.

The active principle, preferably of vitamin A, in oily form is introduced into one or both of the two storage containers (1) and (2) at the top of the tower. The storage container is preferably maintained at a temperature of between 50° C. and 70° C. The nozzle (4) is preferably maintained at a temperature of between 70° C. and 80° C.

The system for recovering the spherules at the bottom of the tower contains either at least one liquid crosslinking agent or a solution, preferably aqueous, optionally containing a crosslinking agent. According to the most preferred method of implementation of the invention, the recovery system is a trough (10) containing an aqueous solution of the crosslinking agent, and the feed of the recovery system is preferably tangential to the system for isolating the spherules as shown in FIG. 2. The liquid recovery trough thus preferably has a relatively flat shape ending in a cone arranged tangentially to the system for isolating the spherules.

The system for isolating the spherules preferably consists of a filter drum (13) containing a screen (15) and a scraping system (14). The scraping system, such as a doctor blade, enables the spherules, preferably crosslinked, to be collected while the crosslinking agent or solution (11), which forms the filtrate (16), is recycled via (25) in the closed circuit of the recovery system to the trough (10). While being recycled, the aqueous solution containing the crosslinking agent can be passed through an intermediary heating system, not shown. The circulation flow is provided by a volumetric pump, also not shown.

The flow rate of the crosslinking solution can thus be regulated so as to maintain its temperature within a narrow range of between 5° C. and 20° C. This temperature range allows better control of the crosslinking kinetics inside the liquid recovery system for the spherules.

The process described makes it possible to produce spherules of active principles in a continuous fashion and in a simple apparatus. The process does not require the presence of any pulverulent substance other than the required composition. Additionally, the process does not require a drying stage before the crosslinking is performed. The process therefore offers an enormous advantage when compared with all of the processes known hitherto.

The present invention will be described more completely with the aid of the following examples, which should not be considered in any way as limiting the invention.

EXAMPLE 1

AQUEOUS SOLUTION OF THE PROTEIN

The following were introduced into a 50-liter reactor stirred by a dispersing turbine rotating at 450–500 revolutions/minute:

2.10 liters of water 0.10 kg of glycerin.

The mixture was heated to 60° C. The following were added, with stirring:

0.37 kg of lactose 0.62 kg of gelatin.

Stirring was continued for 35 minutes at 60° C.

THE ALIMENTARY CHARGE

In a reactor, the following vitamin-consisting charge was mixed:

0.30 kg of vitamin A in acetate form 0.08 kg of ionol 0.02 kg of antioxidant agent (BHT)

0.003 kg of surfactant (IRGANOX®).

PREPARATION OF THE OIL-IN-WATER EMULSION

The whole mixture of the alimentary charge was heated to approximately 60° C. and was poured into the above 50-liter reactor, in which the turbine was brought to 3000 revolutions/minute. Stirring was continued for 20 minutes, while the temperature was maintained at 60° C.

PRILLING TOWER (FIG. 1)

3.6 kg of the oil-in-water emulsion was introduced into one of the two storage containers, (1) or (2), of the prilling tower.

The coolant air was introduced into the bottom of the tower (3) at a temperature of −6° C. and at a flow rate of 620 m$^3$/h. The coolant air was allowed to exit the tower at point (6), below the exit of the nozzle (4) at a temperature of 5° C.

Pressurized nitrogen (5) was allowed to enter the storage containers (1) and (2) at a pressure of approximately 4 bars. Air (7) at an ambient temperature was also allowed to enter the tower through the nozzle concurrently with a jet of air leaving the nozzle exit, at a velocity of between 1 to 1.5 m/second. The product exited the nozzle (4) at a temperature of 77° C.

Baffles were introduced into the tower at (8) and a grid for homogenizing the air flow was introduced at (9).

A nozzle (4) with 7 holes was chosen, wherein each hole had a diameter of 100 microns and was subjected to an electrical vibration of 4030 hertz.

RECOVERY SYSTEM FOR THE SPHERULES (FIG. 2)

The recovery system for the spherules was situated at the bottom of the tower and was in the form of a trough (10) in which the aqueous solution of glutaraldehyde (11) at a concentration of 5% by weight was circulating. Specifically, the spherules (21) were allowed to fall into the recovery trough (10) which contained the aqueous solution of glutaraldehyde crosslinking agent (11). The spherules were entrained towards the outlet (23) of the recovery trough (10), which outlet was located tangentially (24) to the surface of a filter drum (13). The filter drum (13) was made up of a filter screen (15) whose mesh opening was 250 microns. The filter drum was rotating at approximately 10 revolutions per minute. A bronze doctor blade (14) allowed the crosslinked spherules to be collected; the filtrate (16) was returned to the trough (10) towards a heating circuit, not shown.

The vitamin A content of the spherules produced was on average 500,000 IU per gram, the extractable content represented 50 IU/g and the particle size exhibited the following distribution (in microns):

|  | % by weight |
|---|---|
| Oversize 500 10$^{-6}$ m | 0.4 |
| 400 10$^{-6}$ m | 21.5 |
| 315 10$^{-6}$ m | 53.3 |
| 250 10$^{-6}$ m | 24.6 |
| 200 10$^{-6}$ m | 0.1 |

EXAMPLES 2, 3 AND 4

The procedure of Example 1 was reproduced for each of Examples 2, 3 and 4 and incorporated the respective variations as follows: Example 2 employed a vitamin-consisting charge which did not contain any surface-active agent; Example 3 employed a vitamin-consisting charge which did not contain any antioxidant agent; and Example 4 employed a vitamin-consisting charge which did not contain any surface-active agent or any antioxidant agent. The particle size of the spherules obtained in Examples 2, 3 and 4 was measured and is illustrated by the following chart:

| | | Particle size in mm | | | | |
|---|---|---|---|---|---|---|
| Examples | Charges | >0.500 | >0.400 | >0.315 | >0.250 | >0.200 |
| 2 | without surfactant | 0.8 | 29.5 | 50.6 | 18.8 | 0.2 |
| 3 | without antioxidant | 0.55 | 23.3 | 47.3 | 29.5 | 0 |
| 4 | without surfactant without antioxidant | 0.25 | 23.7 | 54 | 22.1 | 0.1 |

What is claimed is:

1. A process for the preparation of spherules of at least one of Vitamin A acetate and Vitamin E which comprises:

in a first step, preparing an oil-in-water emulsion of at least one of Vitamin A acetate and Vitamin E suspended in water, the water containing at least one protein;

in a second step, forming spherules by passing the oil-in-water emulsion through a nozzle;

in a third step, allowing the spherules formed to fall in a tower countercurrent to a flow of cold air into at least one liquid crosslinking agent for a time sufficient to crosslink the spherules; and in a fourth step, recovering the spherules from the liquid crosslinking agent.

2. A process according to claim 1, wherein the protein is gelatin.

3. A process according to claim 1, wherein at least one of Vitamin A acetate and Vitamin E is combined with an oil selected from rapeseed oil, peanut oil, sunflower oil and cod liver oil.

4. A process according to claim 1, wherein the oil-in-water emulsion additionally contains an antioxidant agent.

5. A process according to claim 4, wherein the antioxidant agent is selected from 3-tert-butyl-4-hydroxyanisole, 3,5-di-tert-butyl-4-hydroxytoluene, 6-ethoxy-1,2-dihydroxy-2,2,4-trimethylquinoline and 2-tert-butyl-1,4-dihydroxytoluene.

6. A process according to claim 1, wherein the oil-in-water emulsion additionally contains a surface-active agent.

7. A process according to claim 6, wherein the surface-active agent is selected from dilauryl thiodipropionate, an alkali-earth metal stearate, an alkaline-earth metal stearate, sodium 2-stearoyllactylate, calcium 2-stearoyllactylate and carboxymethyl cellulose.

8. A process according to claim 1, wherein the oil-in-water emulsion is formed by mixing at least one of Vitamin A acetate and Vitamin E with an aqueous solution containing at least one protein.

9. A process according to claim 8, wherein at least one of Vitamin A acetate and Vitamin E is combined with one or more antioxidant agents and/or one or more surface active agents and further wherein the combination is mixed with the aqueous solution.

10. A process according to claim 8, wherein the aqueous solution mixed with at least one of Vitamin A acetate and Vitamin E additionally contains one or more surface-active agents.

11. A process according to claim 8, wherein the oil-in-water emulsion is formed by mixing from 10 to 30% by weight of at least one of Vitamin A acetate and Vitamin E with from 70 to 90% by weight of aqueous solution containing at least one protein.

12. A process according to claim 1, wherein prior to recovering the spherules, the spherules are contacted by the crosslinking agent for a time sufficient to crosslink the spherules.

13. A process according to claim 12, wherein the crosslinking agent is an aldehyde selected from acetaldehyde, glutaraldehyde and glyoxal.

14. A process according to claim 12, wherein the crosslinking agent is contained in an aqueous solution of 5 to 20% by weight of the crosslinking agent.

15. A process according to claim 1, wherein the oil-in-water emulsion is passed concurrently with a jet of air through the nozzle and wherein the nozzle is a vibrated nozzle comprising one or more perforations and further wherein the crosslinking agent is an aldehyde.

16. A process according to claim 15, wherein the diameter of one or more perforations of the nozzle is approximately 100 microns.

17. A process according to claim 15, wherein the temperature of the jet of air is between ambient temperature and 60° C.

18. A process according to claim 1, wherein the temperature of the cold air is between −20° C. and 20° C.

19. A process according to claim 1, wherein the solution is an aqueous solution containing a crosslinking agent and further wherein the spherules fall into a recovery trough containing the aqueous solution containing the crosslinking agent, and further wherein the trough tangentially feeds a rotating drum to allow for recovery of the spherules from the aqueous solution containing the crosslinking agent.

20. A process according to claim 19, wherein the aqueous solution containing the crosslinking agent is maintained at a temperature of between 5° C. and 20° C.

21. A process according to claim 19, wherein the aqueous solution containing the crosslinking agent is passed over the drum and is then recycled to the recovery trough.

22. A process according to claim 21 wherein the aqueous solution containing the crosslinking agent is passed through an intermediary heating system while being recycled to the recovery trough.

* * * * *